United States Patent
Dai et al.

(10) Patent No.: US 10,620,903 B2
(45) Date of Patent: Apr. 14, 2020

(54) METHOD AND DEVICE FOR PROCESSING DISPLAY DATA

(71) Applicant: Goertek Inc., Weifang (CN)

(72) Inventors: Tianrong Dai, Weifang (CN); Yuge Zhu, Weifang (CN); Dachuan Zhao, Weifang (CN); Xiang Chen, Weifang (CN)

(73) Assignee: GOERTEK INC., Shandong Province (CN)

( * ) Notice: Subject to any disclaimer, the term of this patent is extended or adjusted under 35 U.S.C. 154(b) by 25 days.

(21) Appl. No.: 15/761,174

(22) PCT Filed: Nov. 17, 2017

(86) PCT No.: PCT/CN2017/111590
§ 371 (c)(1),
(2) Date: Mar. 19, 2018

(87) PCT Pub. No.: WO2018/223618
PCT Pub. Date: Dec. 13, 2018

(65) Prior Publication Data
US 2019/0235817 A1  Aug. 1, 2019

(30) Foreign Application Priority Data

Jun. 9, 2017 (CN) .......................... 2017 1 0433460

(51) Int. Cl.
*G06F 3/147* (2006.01)
*G06T 7/11* (2017.01)
(Continued)

(52) U.S. Cl.
CPC .............. *G06F 3/147* (2013.01); *G06F 3/011* (2013.01); *G06F 3/1454* (2013.01); *G06T 7/11* (2017.01);
(Continued)

(58) Field of Classification Search
CPC combination set(s) only.
See application file for complete search history.

(56) References Cited

U.S. PATENT DOCUMENTS

2005/0088669 A1    4/2005   Suino et al.
2010/0231800 A1*   9/2010   White .................. G09G 3/2022
                                                                            348/663

(Continued)

FOREIGN PATENT DOCUMENTS

CN    102611801 A    7/2012
CN    103249352 A    8/2013
(Continued)

OTHER PUBLICATIONS

Office Action dated Aug. 28, 2018, by the Chinese Patent Office in corresponding Chinese Patent Application No. 201710433460.7. (9 pages).
(Continued)

*Primary Examiner* — William A Beutel
(74) *Attorney, Agent, or Firm* — Buchanan Ingersoll & Rooney PC

(57) ABSTRACT

A method for processing display data and a virtual reality device. The method comprises: the host divides the display area into a central area and an edge area according to the field of view of a head-mounted display; segments each frame of the display data into first display data corresponding to the central area and second display data corresponding to the edge area; processes the first display data and the second display data according to a first transmission factor and a second transmission factor to obtain first transmission data and second transmission data and sends them to the head-mounted display; and the head-mounted display performs image reconstruction to the received first transmission data and second transmission data, to obtain the displayed image corresponding to the frame of display data, and (Continued)

outputs and display it. The virtual reality device comprises the above host and head-mounted display.

5 Claims, 2 Drawing Sheets

(51) Int. Cl.

| | | |
|---|---|---|
| *G09G 3/00* | (2006.01) | |
| *H04L 29/06* | (2006.01) | |
| *G06F 3/14* | (2006.01) | |
| *H04N 5/00* | (2011.01) | |
| *G06F 3/01* | (2006.01) | |
| *H04N 13/332* | (2018.01) | |

(52) U.S. Cl.
CPC ............ *G09G 3/001* (2013.01); *H04L 67/38* (2013.01); *H04N 5/00* (2013.01); *H04N 13/332* (2018.05); *G06T 2210/08* (2013.01); *G09G 2310/0232* (2013.01); *G09G 2340/0435* (2013.01); *G09G 2350/00* (2013.01)

(56) References Cited

U.S. PATENT DOCUMENTS

| | | |
|---|---|---|
| 2012/0146891 A1 | 6/2012 | Kalinli |
| 2012/0319928 A1 | 12/2012 | Rhodes |
| 2013/0300652 A1 | 11/2013 | Raffle et al. |
| 2014/0132616 A1 | 5/2014 | Han et al. |
| 2014/0184475 A1 | 7/2014 | Tantos et al. |
| 2015/0077329 A1 | 3/2015 | Yoon et al. |
| 2016/0366392 A1 | 12/2016 | Raghoebardajal et al. |
| 2018/0091577 A1* | 3/2018 | Park .................... H04N 21/236 |
| 2018/0137602 A1* | 5/2018 | Spitzer ............... G02B 27/2228 |
| 2018/0288423 A1* | 10/2018 | Vembar .................... G06T 9/00 |

FOREIGN PATENT DOCUMENTS

| | | |
|---|---|---|
| CN | 103902029 A | 7/2014 |
| CN | 103930817 A | 7/2014 |
| CN | 104699249 A | 6/2015 |
| CN | 104704530 A | 6/2015 |
| CN | 105139792 A | 12/2015 |
| CN | 105340279 A | 2/2016 |
| CN | 105827866 A | 8/2016 |
| CN | 105979224 A | 9/2016 |
| CN | 106412563 A | 2/2017 |
| CN | 106464854 A | 2/2017 |
| CN | 106686295 A | 5/2017 |
| CN | 107239144 A | 10/2017 |
| CN | 107333119 A | 11/2017 |
| CN | 106210692 A | 12/2017 |
| WO | WO 2017/035053 A1 | 3/2017 |

OTHER PUBLICATIONS

International Search Report (PCT/ISA/210) dated Feb. 24, 2018, by the Chinese Patent Office as the International Searching Authority for International Application No. PCT/CN2017/111590.

Written Opinion (PCT/ISA/237) dated Feb. 24, 2018, by the Chinese Patent Office as the International Searching Authority for International Application No. PCT/CN2017/111590.

Office Action (The Second Office Action) dated May 7, 2019, by the State Intellectual Property Office (SIPO) of the People's Republic of China in corresponding Chinese Patent Application No. 201710433460.7 and an English Translation of the Office Action. (21 pages).

* cited by examiner

METHOD AND DEVICE FOR PROCESSING DISPLAY DATA

CROSS REFERENCE TO RELATED APPLICATIONS

This application is a National Stage entry of International Application No.: PCT/CN2017/111590, filed on Nov. 11, 2017, which claims priority to Chinese Patent Application No. 201710433460.7, filed on Jun. 9, 2017. The entire contents of each of which are incorporated herein by reference.

TECHNICAL FIELD

The application pertains to the technical field of data transmission, and particularly relates to a method and device for processing display data.

BACKGROUND

Virtual reality devices (VR) generally comprise a host and a display which are connected through a wired or wireless connection. As a larger display screen and a larger field of view attract more eyeballs, the displays of virtual reality devices on the market generally have a relatively large field of view (FOV), for example, a field of view as large as 120° and even 150°. However, displays having a relatively large field of view will have a large latency time when the host is transmitting mass data such as image data and video data.

Taking a monocular 1K display screen (with a resolution of 1200*1080 and a display refresh rate of 90 Hz) as example, if 1 pixel point is expressed by 24 bit, image data of 1200*1080*2 (two eyes)*90*24=5.6G bit/s must be transmitted. The transmission of such a large amount of image data will occupy a large bandwidth, and when the host and the display of the virtual reality device are wirelessly connected, the data must be compressed and decompressed, which will result in a too large latency time which is a key factor affecting the VR experience.

SUMMARY

An object of the present disclosure is to provide a method and device for processing display data, to solve the problem of the relatively large latency time of the data transmission between the host and the display of virtual reality devices.

To achieve the above object, the technical solutions of the present disclosure are realized as follows.

In an aspect, the present disclosure provides a method for processing display data, applied to a host of a virtual reality device, wherein the method comprises the step of:

dividing a display area of a head-mounted display into a central area and an edge area according to a field of view of the head-mounted display of the virtual reality device;

segmenting display data to be transmitted of each frame into first display data corresponding to the central area and second display data corresponding to the edge area according to ranges of the central area and the edge area;

processing the first display data and the second display data respectively according to a preset first transmission factor and a preset second transmission factor, to obtain first transmission data and second transmission data, wherein a bandwidth occupied by the second transmission data is less than a bandwidth occupied by the first transmission data; and sending the first transmission data and the second transmission data to the head-mounted display.

In another aspect, the present disclosure further provides a method for processing display data, applied to a head-mounted display of a virtual reality device, wherein the method comprises the step of:

receiving first transmission data and second transmission data that are sent by a host of the virtual reality device, wherein a bandwidth occupied by the second transmission data is less than a bandwidth occupied by the first transmission data, and the first transmission data and the second transmission data are obtained by segmenting each frame of the display data according to ranges of a central area and an edge area to obtain first display data and second display data and then processing the first display data and the second display data by using a first transmission factor and a second transmission factor, wherein the central area and the edge area are obtained by dividing a display area of the head-mounted display according to a field of view of the head-mounted display;

performing image reconstruction to the received first transmission data and second transmission data, to obtain a displayed image corresponding to the frame of display data; and outputting and displaying the displayed image.

In still another aspect, the present disclosure provides a virtual reality device, comprising a host and a head-mounted display, wherein the host divides a display area of the head-mounted display into a central area and an edge area according to a field of view of the head-mounted display; segments display data to be transmitted of each frame into first display data corresponding to the central area and second display data corresponding to the edge area according to ranges of the central area and the edge area; processes the first display data and the second display data respectively according to a preset first transmission factor and a preset second transmission factor, to obtain first transmission data and second transmission data, wherein a bandwidth occupied by the second transmission data is less than a bandwidth occupied by the first transmission data; and sends the first transmission data and the second transmission data to the head-mounted display; and the head-mounted display receives the first transmission data and the second transmission data sent by the host; performs image reconstruction to the received first transmission data and second transmission data, to obtain a displayed image corresponding to the frame of display data; and outputs and display s the displayed image.

The advantageous effects of the embodiments of the present disclosure are as follows. According to the present disclosure, in the host of the virtual reality device, the display area of the head-mounted display is divided into the central area which the user cares much about and the edge area which the user cares little about according to the field of view of the head-mounted display, and the display data corresponding to the central area and the edge area respectively are processed differently so that in data transmission the bandwidth occupied by the display data corresponding to the edge area is less than the bandwidth occupied by the display data corresponding to the central area. Thus, the total bandwidth occupied in data transmission is decreased, the host can send the transmission data to the head-mounted display without compressing the transmission data, and the head-mounted display does not need to decompress the transmission data either, thereby decreasing the latency time of data display and improving the user experience.

DETAILED DESCRIPTION

In order to make the objects, technical solutions and advantages of the present disclosure clearer, the embodiments of the present disclosure will be described below in further detail in conjunction with the drawings.

The edge part of the visual field of head-mounted displays having a large field of view merely provides the user immersion in a VR environment. The user, if not having severe strabismus or crossed eyes, will care little about the display details in the edge area of the visual field, and the decreasing of the display refresh rate or the display resolution of this area will not cause dizziness or other discomfort of the user.

In view of the above situation, the present disclosure, in the host of the virtual reality device, divides the display area of the head-mounted display according to the field of view to ensure data transmission with the original display refresh rate or the original display resolution in the center key area that the user normally observes while decreasing the display refresh rate or the display resolution in the non-key area, thereby the transmission bandwidth occupation is decreased, the compression and decompression of the transmission data are not needed, and the latency time is remarkably decreased.

Figure 1:
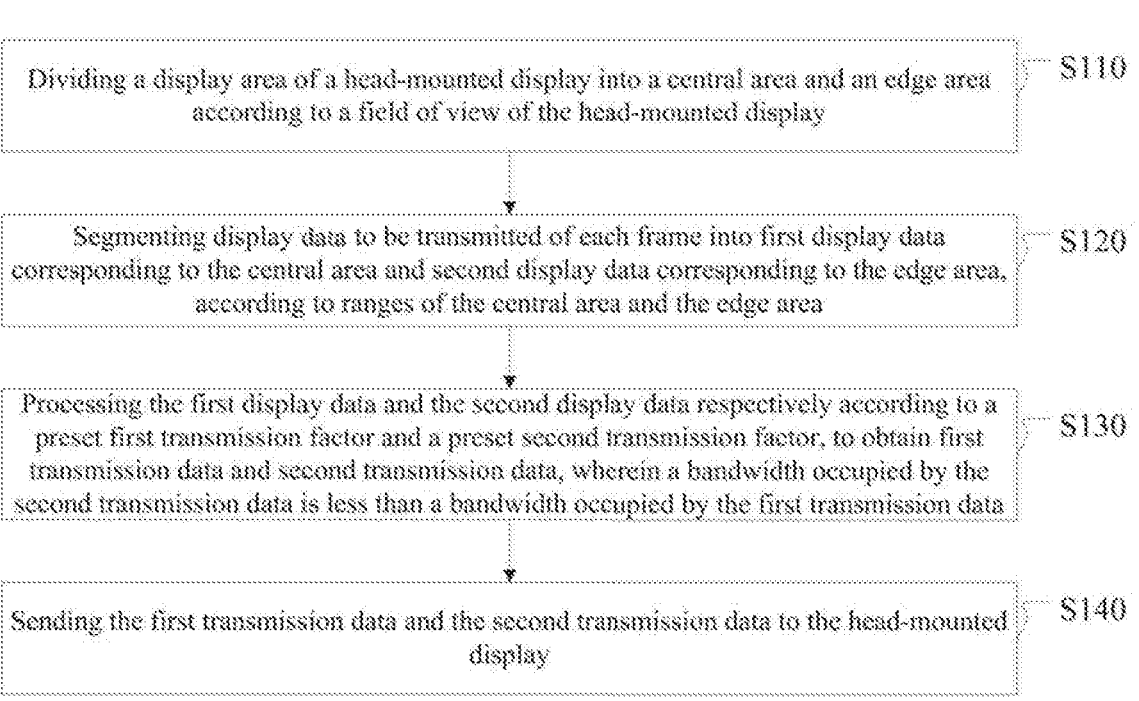
FIG. 1 is a flow chart of a method for processing display data applied to the sending end of the host in accordance with an embodiment of the present disclosure.

FIG. 1 is a flow chart of a method for processing display data applied to the sending end of the host in accordance with an embodiment of the present disclosure. The method is applied to the host of the virtual reality device, and especially suitable for a host that conducts data transmission with a head-mounted display through a wireless connection.

As shown in FIG. 1, the method of the embodiment of the present disclosure comprises the following steps.

S110, Dividing a display area of a head-mounted display into a central area and an edge area according to a field of view of the head-mounted display.

Since the edge part of the visual field of head-mounted displays having a large field of view is merely for providing the user immersion in a VR environment, the user cares little about the display details in the edge area of the visual field, and the decreasing of the display refresh rate or the display resolution of this area will not cause dizziness or other discomfort of the user, in the present embodiment, the display area can be divided according to the field of view of the head-mounted display, the central area after dividing is the key area that the user can observe, and the edge area after dividing is the non-key area that the user cares little about. Because the key area of the head-mounted display usually corresponds to the display area with a field of view FOV<90°, in the present embodiment, preferably, the central area corresponds to the display area of the head-mounted display with a field of view less than 90°.

Figure 2:
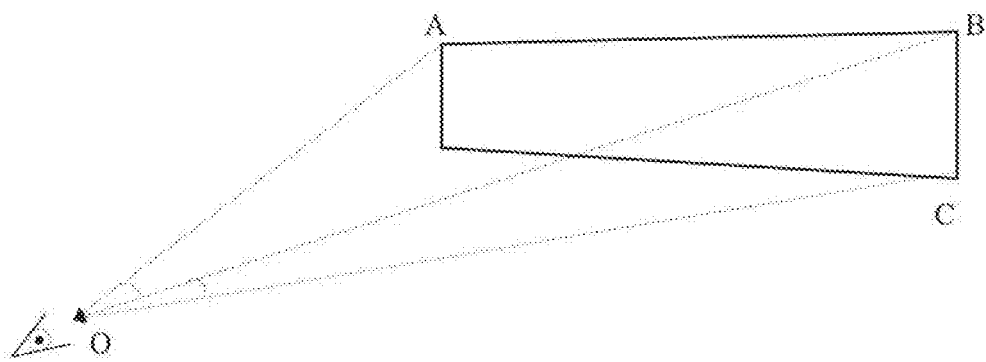
FIG. 2 is a schematic diagram of the field of view of a head-mounted display in accordance with an embodiment of the present disclosure.

As shown in FIG. 2, the field of view of the head-mounted display is generally expressed by the horizontal field of view ∠AOB and the vertical field of view ∠BOC. Herein, the central area and the edge area may be divided according to the following method:

acquiring a horizontal field of view and a vertical field of view for dividing the display area; and setting an area enclosed by the horizontal field of view and the vertical field of view to be the central area, and setting the remaining area of the display area to be the edge area.

Exemplarily, when the field of view of the head-mounted display of the present embodiment is expressed by the horizontal field of view and the vertical field of view, the central area and the edge area may be divided according to the criteria that the horizontal field of view is less than 90° and the vertical field of view is less than 80°.

It should be noted that, FIG. 2 merely illustratively shows a rectangular central area, and in the present embodiment, the shapes of and the proportion between the central area and the edge area are not limited. In the present embodiment, the central area corresponds to the key area which the user cares much about, and the edge area corresponds to the non-key area which the user cares little about.

S120, Segmenting display data to be transmitted of each frame into first display data corresponding to the central area and second display data corresponding to the edge area, according to ranges of the central area and the edge area.

In the present embodiment, the method of segmenting is not limited to segmenting each frame of the display data, and all conventional segmenting algorithms for image data in the prior art, such as region based segmenting algorithms, may be used in segmenting.

S130, Processing the first display data and the second display data respectively according to a preset first transmission factor and a preset second transmission factor, to obtain first transmission data and second transmission data, wherein a bandwidth occupied by the second transmission data is less than a bandwidth occupied by the first transmission data.

In the present embodiment, the transmission factors (namely, the first transmission factor and the second transmission factor) refer to processing elements that influence the bandwidth occupied by data transmission, such as the display resolution and the display refresh rate.

S140, Sending the first transmission data and the second transmission data to the head-mounted display.

In the present embodiment, the host may send the transmission data to the head-mounted display via a wired transmission channel such as HDMI, Display Port and USB Type-C. The host may also send the transmission data to the head-mounted display wirelessly via a wireless transmission channel such as using the 60 GHz millimeter wave band.

According to the present embodiment, in the host of the virtual reality device, the display area of the head-mounted display is divided into the central area which the user cares much about and the edge area which the user cares little about according to the field of view of the head-mounted display, and the display data corresponding to the central area and the edge area respectively are processed differently so that in data transmission the bandwidth occupied by the display data corresponding to the edge area is less than the bandwidth occupied by the display data corresponding to the central area. Thus, the total bandwidth occupied in data transmission is decreased, the host can send the transmission data to the head-mounted display without compressing the transmission data, and the head-mounted display does not need to decompress the transmission data either, thereby decreasing the latency time of data display and improving the user experience.

In some implementing solutions of the present embodiment, the display data are processed by using any one of the following three modes.

In the first mode, the first transmission factor is a first display resolution, and the second transmission factor is a second display resolution.

Then the step that first display data and the second display data are processed respectively according to a preset first transmission factor and a preset second transmission factor, to obtain first transmission data and second transmission data, specifically, comprises the following steps:

setting a first display resolution and a second display resolution according to a bandwidth of a data transmission channel, wherein the second display resolution is less than the first display resolution;

presetting the first transmission factor as the first display resolution, and presetting the second transmission factor as the second display resolution; and setting a display resolution of the first display data corresponding to the central area to be the first display resolution, and setting a display resolution of the second display data corresponding to the edge area to be the second display resolution, to obtain the first transmission data and the second transmission data.

In practical applications, the first display resolution may remain to be an original display resolution of each frame of the display data, and the second display resolution is less than the original display resolution. Namely, the first display resolution of the first display data corresponding to the central area may remain to be the original display resolution, and the second display resolution of the second display data corresponding to the edge area is decreased compared with the original display resolution.

In the second mode, the first transmission factor is a first display refresh rate, and the second transmission factor is a second display refresh rate.

Then the step of processing the first display data and the second display data respectively according to a preset first transmission factor and a preset second transmission factor, to obtain first transmission data and second transmission data, specifically, comprises the following steps:

setting a first display refresh rate and a second display refresh rate according to a bandwidth of a data transmission channel, and the second display refresh rate is less than the first display refresh rate;

presetting the first transmission factor as the first display refresh rate, and presetting the second transmission factor as the second display refresh rate; and setting a display refresh rate of the first display data corresponding to the central area to be the first display refresh rate, and setting a display refresh rate of the second display data corresponding to the edge area to be the second display refresh rate, to obtain the first transmission data and the second transmission data.

In practical applications, the first display refresh rate may remain to be an original display refresh rate of the each frame of display data to be transmitted, and the first display refresh rate is an integer multiple of the second display refresh rate. Namely, the first display resolution of the first display data corresponding to the central area may remain to be the original display resolution, and the second display resolution of the second display data corresponding to the edge area is decreased compared with the original display resolution, for example, when three frames of the display data corresponding to the central area are updated, only one frame of the display data corresponding to the edge area are updated.

In the third mode, the first transmission factor is a first display resolution and a first display refresh rate, and the second transmission factor is a second display resolution and a second display refresh rate.

Then the step of processing the first display data and the second display data respectively according to a preset first transmission factor and a preset second transmission factor, to obtain first transmission data and second transmission data, specifically, comprises the following steps:

setting a first display resolution, a first display refresh rate, a second display resolution and a second display refresh rate according to a bandwidth of a data transmission channel, the second display resolution is less than the first display resolution, and the second display refresh rate is less than the first display refresh rate;

presetting the first transmission factor as the first display resolution and the first display refresh rate, and presetting the second transmission factor as the second display resolution and the second display refresh rate; and setting a display resolution and a display refresh rate of the first display data corresponding to the central area respectively to be the first display resolution and the first display refresh rate, and setting a display resolution and a display refresh rate of the second display data corresponding to the edge area respectively to be the second display resolution and the second display refresh rate, to obtain the first transmission data and the second transmission data.

In practical applications, the first display resolution of the first display data corresponding to the central area may remain to be the original display resolution, and the second display resolution of the second display data corresponding to the edge area is decreased compared with the original display resolution; and the first display refresh rate of the first display data corresponding to the central area may remain to be the original display refresh rate, and the second display refresh rate of the second display data corresponding to the edge area is decreased compared with the original display refresh rate, for example, when three frames of the display data corresponding to the central area are updated, only one frame of the display data corresponding to the edge area are updated.

Figure 3:
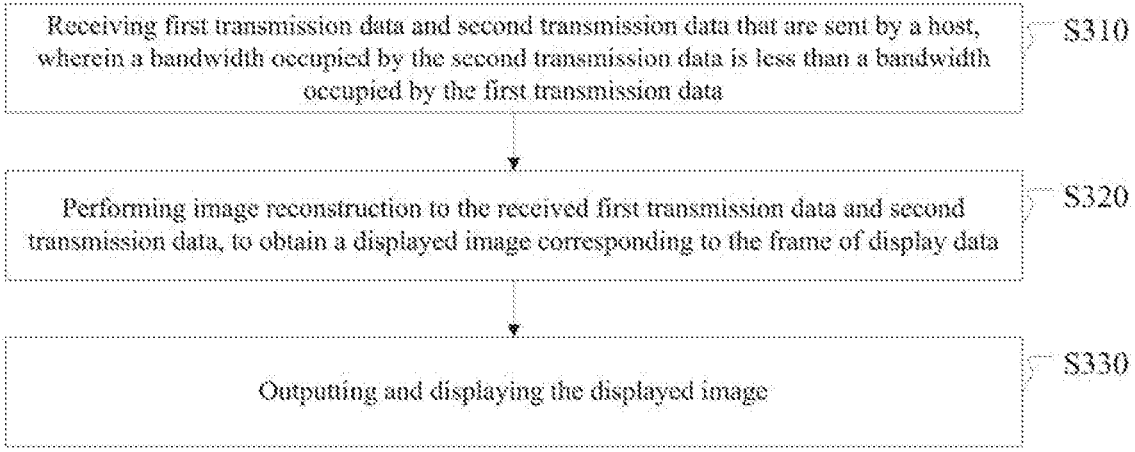
FIG. 3 is a flow chart of a method for processing display data applied to a head-mounted display in accordance with an embodiment of the present disclosure.

FIG. 3 is a flow chart of a method for processing display data applied to a head-mounted display in accordance with an embodiment of the present disclosure. The method is applied to a head-mounted display of a virtual reality device, and is especially suitable for a head-mounted display that conducts data transmission with a host of a virtual reality device through a wireless connection. As shown in FIG. 3, the method of the present embodiment comprises the following steps.

S310, Receiving first transmission data and second transmission data that are sent by a host, wherein a bandwidth occupied by the second transmission data is less than a bandwidth occupied by the first transmission data.

In the present embodiment, the first transmission data and the second transmission data are obtained by segmenting each frame of the display data according to ranges of a central area and an edge area to obtain first display data and second display data, and then processing the first display data and the second display data by using a first transmission factor and a second transmission factor; the central area and the edge area are obtained by dividing a display area of the head-mounted display according to a field of view of the head-mounted display.

In other words, in the present embodiment, the first transmission data and the second transmission data that are received by the head-mounted display of are the first transmission data and the second transmission data that are obtained by processing display data to be transmitted of each frame by the host using the method shown in FIG. 1, and the details of the processing can refer to the description above and are not repeated here.

S320, Performing image reconstruction to the received first transmission data and second transmission data, to obtain a displayed image corresponding to the frame of display data.

S330, Outputting and displaying the displayed image.

Because the host segmented each frame of display data to be transmitted, the head-mounted display must perform image reconstruction to the first transmission data and the second transmission data to display the image after receiving the first transmission data and the second transmission data.

In the present embodiment, the head-mounted display performs image reconstruction to the first transmission data and the second transmission data sent from the host. When the display refresh rate is reduced, if the second transmission data corresponding to the edge area are received, they are directly sent to the display screen to display, and if the received second transmission data corresponding to the edge area are void, namely, the second transmission data corresponding to the edge area are not received, the second transmission data corresponding to the edge area of last frame will be reused, and simultaneously the border image data of the two areas are spliced together, and the data after spliced are sent to the display screen to display. When the display resolution is reduced, an image with the original resolution will be reconstructed such as by interpolation, and after the reconstruction the display data can be output and displayed without the need of further processing such as decompression, thereby decreasing the latency time of data display and improving the user experience.

Exemplarily, the image reconstruction of the received first transmission data and second transmission data is performed by the following method:

judging whether the data content of the second transmission data is void, and if the data content of the second transmission data is void, reusing image data of the edge area corresponding to the last frame of displayed image, and performing splicing processing to the image data of the edge area and the image data corresponding to the first transmission data, for example, performing image splicing to the border image data of the two areas by low-pass filtering, to obtain a displayed image corresponding to the frame of display data;

if the data content of the second transmission data is not void, judging whether a display resolution of the second transmission data is less than a display resolution of the first transmission data;

if the display resolution of the second transmission data is less than the display resolution of the first transmission data, performing image reconstruction of the first display resolution to the second transmission data by difference value processing, and compositing the second transmission data after the image reconstruction and the first transmission data into one frame of displayed image to output and display; and if the display resolution of the second transmission data is equal to the display resolution of the first transmission data, compositing the first transmission data and the second transmission data into one frame of displayed image to output and display.

As corresponding to the embodiment of the method for processing display data above, the present disclosure further provides an embodiment of a processing device.

Figure 4:
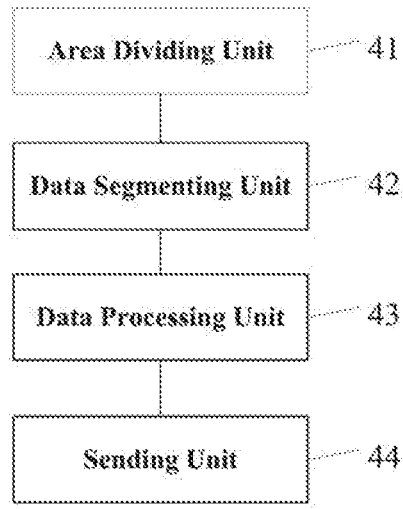
FIG. 4 is a structural block diagram of a device for processing display data applied to a sending end of a host in accordance with an embodiment of the present disclosure.

FIG. 4 is a structural block diagram of a device for processing display data applied to a sending end of a host in accordance with an embodiment of the present disclosure. The device is applied to a host of a virtual reality device, and is especially suitable for a host that performs data transmission with a head-mounted display through a wireless connection.

As shown in FIG. 4, the device of the present embodiment comprises: an area dividing unit 41, a data segmenting unit 42, a data processing unit 43 and a sending unit 44.

The area dividing unit 41 is for dividing a display area of a head-mounted display into a central area and an edge area according to a field of view of the head-mounted display.

The data segmenting unit 42 is for segmenting display data to be transmitted of each frame into first display data corresponding to the central area and second display data corresponding to the edge area, according to ranges of the central area and the edge area.

The data processing unit 43 is for processing the first display data and the second display data respectively according to a preset first transmission factor and a preset second transmission factor, to obtain first transmission data and second transmission data, wherein a bandwidth occupied by the second transmission data is less than a bandwidth occupied by the first transmission data.

The sending unit 44 is for sending the first transmission data and the second transmission data to the head-mounted display by wireless transmission.

According to the present embodiment, in the host of the virtual reality device, the display area of the head-mounted display is divided into the central area which the user cares much about and the edge area which the user cares little about according to the field of view of the head-mounted display, and the display data corresponding to the central area and the edge area respectively are processed differently so that in data transmission the bandwidth occupied by the display data corresponding to the edge area is less than the bandwidth occupied by the display data corresponding to the central area. Thus, the total bandwidth occupied in data transmission is decreased, the host can send the transmission data to the head-mounted display without compressing the transmission data, and the head-mounted display does not need to decompress the transmission data either, thereby decreasing the latency time of data display and improving the user experience.

The transmission factors of the present embodiment (namely, the first transmission factor and the second transmission factor) refer to processing elements that influence the bandwidth occupied by data transmission, such as the display resolution, the display refresh rate and the like.

When the first transmission factor is the first display resolution and the first transmission factor is the second display resolution, the data processing unit 43 is specifically for setting a first display resolution and a second display resolution according to a bandwidth of a data transmission channel, wherein the second display resolution is less than the first display resolution; and setting a display resolution of the first display data corresponding to the central area to be the first display resolution, and setting a display resolution of the second display data corresponding to the edge area to be the second display resolution, to obtain the first transmission data and the second transmission data.

When the first transmission factor is the first display refresh rate and the second transmission factor is the second display refresh rate, the data processing unit 43 is specifically for setting a first display refresh rate and a second display refresh rate according to a bandwidth of a data transmission channel, wherein the second display refresh rate is less than the first display refresh rate; and setting a display refresh rate of the first display data corresponding to the central area to be the first display refresh rate, and setting a display refresh rate of the second display data corresponding to the edge area to be the second display refresh rate, to obtain the first transmission data and the second transmission data.

When the first transmission factor is the first display resolution and the first display refresh rate, the second transmission factor is the second display resolution and the second display refresh rate, the data processing unit 43 is specifically for setting a first display resolution, a first display refresh rate, a second display resolution and a second display refresh rate according to a bandwidth of a data transmission channel, wherein the second display resolution is less than the first display resolution, and the second display refresh rate is less than the first display refresh rate; and setting a display resolution and a display refresh rate of the first display data corresponding to the central area respectively to be the first display resolution and the first display refresh rate, and setting a display resolution and a display refresh rate of the second display data corresponding to the edge area respectively to be the second display resolution and the second display refresh rate, to obtain the first transmission data and the second transmission data.

Figure 5:
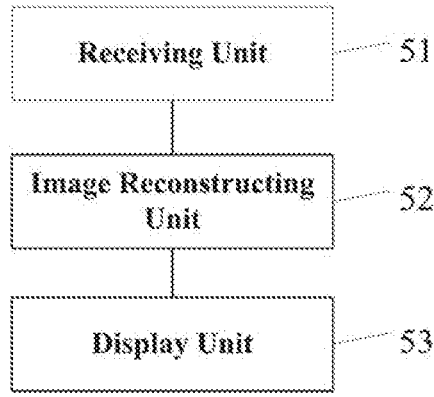
FIG. 5 is a structural block diagram of a device for processing display data applied to a head-mounted display in accordance with an embodiment of the present disclosure.

FIG. 5 is a structural block diagram of a device for processing display data applied to a head-mounted display in accordance with an embodiment of the present disclosure. The device is applied to a head-mounted display of a virtual reality device, and is especially suitable for a head-mounted display that conducts data transmission with a host through a wireless connection.

As shown in FIG. 5, the device of the present embodiment comprises: a receiving unit 51, an image reconstructing unit 52 and a display unit 53.

The receiving unit 51 is for receiving first transmission data and second transmission data that are sent by a host, wherein a bandwidth occupied by the second transmission data is less than a bandwidth occupied by the first transmission data.

In the present embodiment, the first transmission data and the second transmission data received by the receiving unit 51 are obtained by segmenting each frame of the display data according to ranges of a central area and an edge area to obtain first display data and second display data, and then processing the first display data and the second display data by using a first transmission factor and a second transmission factor; the central area and the edge area are obtained by dividing a display area of the head-mounted display according to a field of view of the head-mounted display.

The image reconstructing unit 52 is for performing image reconstruction to the received first transmission data and second transmission data, to obtain a displayed image corresponding to the frame of display data.

The display unit 53 is for outputting and displaying the displayed image.

In the present embodiment, the head-mounted display performs image reconstruction to the first transmission data and the second transmission data sent from the host. When the display refresh rate is reduced, if the second transmission data corresponding to the edge area are received, they are directly sent to the display screen to display, and if the received second transmission data corresponding to the edge area are void, namely, the second transmission data corresponding to the edge area are not received, the second transmission data corresponding to the edge area of last frame will be reused, and simultaneously the border image data of the two areas are spliced together, and the data after spliced are sent to the display screen to display. When the display resolution is reduced, an image with the original resolution will be reconstructed such as by interpolation, and after the reconstruction the display data can be output to display without the need of further processing such as decompression, thereby decreasing the latency time of data display and improving the user experience.

Exemplarily, the device in FIG. 5 further comprises a judging unit, and the judging unit is for judging whether data content of the second transmission data is void, and when it is determined that the data content of the second transmission data is not void, judging whether a display resolution of the second transmission data is less than a display resolution of the first transmission data.

At this point, the image reconstructing unit 52 is specifically for, when the judging unit determines that the data content of the second transmission data is void, reusing image data of the edge area corresponding to the last frame of displayed image, and performing splicing processing to the image data of the edge area and the image data corresponding to the first transmission data, to obtain a displayed image corresponding to the frame of display data; when the judging unit determines that the display resolution of the second transmission data is less than the display resolution of the first transmission data, performing image reconstruction of the first display resolution to the second transmission data by difference value processing, and compositing the second transmission data after the image reconstruction and the first transmission data into one frame of displayed image and sending to the display unit 53 to output and display; and when the judging unit determines that the display resolution of the second transmission data is equal to the display resolution of the first transmission data, compositing the first transmission data and the second transmission data into one frame of displayed image and sending to the display unit 53 to output and display.

The operation details of the units of the devices of the embodiments of the present disclosure can refer to the embodiments of the methods of the present disclosure.

As corresponding to the embodiments of the methods for processing display data above, the present disclosure further provides a virtual reality device, comprising a host and a head-mounted display. The host divides a display area of the head-mounted display into a central area and an edge area according to a field of view of the head-mounted display; segments display data to be transmitted of each frame into first display data corresponding to the central area and second display data corresponding to the edge area according to ranges of the central area and the edge area; processes the first display data and the second display data respectively according to a preset first transmission factor and a preset second transmission factor, to obtain first transmission data and second transmission data, wherein a bandwidth occupied by the second transmission data is less than a bandwidth occupied by the first transmission data; and sends the first transmission data and the second transmission data to the head-mounted display. The head-mounted display receives first transmission data and second transmission data that are sent by the host, performs image reconstruction to the received first transmission data and second transmission data, to obtain a displayed image corresponding to the frame of display data, and output and displays the displayed image.

In some embodiments, that the host processes the first display data and the second display data respectively according to a preset first transmission factor and a preset second transmission factor, to obtain first transmission data and second transmission data specifically comprises:

the host sets a first display resolution and a second display resolution according to a bandwidth of a data transmission channel, wherein the second display resolution is less than the first display resolution; and presets the first transmission factor as the first display resolution, and presets the second transmission factor as the second display resolution, and sets a display resolution of the first display data corresponding to the central area to be the first display resolution, and sets a display resolution of the second display data corresponding to the edge area to be the second display resolution, to obtain the first transmission data and the second transmission data.

In some embodiments, that the host processes the first display data and the second display data respectively according to a preset first transmission factor and a preset second transmission factor, to obtain first transmission data and second transmission data specifically comprises:

the host sets a first display refresh rate and a second display refresh rate according to a bandwidth of a data transmission channel, wherein the second display refresh rate is less than the first display refresh rate; presets the first transmission factor as the first display refresh rate, and presets the second transmission factor as the second display refresh rate; and sets a display refresh rate of the first display data corresponding to the central area to be the first display refresh rate, and sets a display refresh rate of the second display data corresponding to the edge area to be the second display refresh rate, to obtain the first transmission data and the second transmission data.

In some embodiments, that the host processes the first display data and the second display data respectively according to a preset first transmission factor and a preset second transmission factor, to obtain first transmission data and second transmission data specifically comprises:

the host sets a first display resolution, a first display refresh rate, a second display resolution and a second display refresh rate according to a bandwidth of a data transmission channel, wherein the second display resolution is less than the first display resolution, and the second display refresh rate is less than the first display refresh rate; presets the first transmission factor as the first display resolution and the first display refresh rate, and presets the second transmission factor as the second display resolution and the second display refresh rate; and sets a display resolution and a display refresh rate of the first display data corresponding to the central area respectively to be the first display resolution and the first display refresh rate, and sets a display resolution and a display refresh rate of the second display data corresponding to the edge area respectively to be the second display resolution and the second display refresh rate, to obtain the first transmission data and the second transmission data.

In some embodiments, that the host divides a display area of the head-mounted display into a central area and an edge area according to a field of view of the head-mounted display specifically comprises:

the host acquires a horizontal field of view and a vertical field of view that are for dividing the display area, sets an area enclosed by the horizontal field of view and the vertical field of view to be the central area, and sets the remaining area of the display area to be the edge area.

In some embodiments, that the head-mounted display performs image reconstruction to the received first transmission data and second transmission data specifically comprises:

the head-mounted display judges whether data content of the second transmission data is void, and if the data content of the second transmission data is void, reusing image data of the edge area corresponding to the last frame of displayed image, and performs splicing processing to the image data of the edge area and the image data corresponding to the first transmission data, to obtain a displayed image corresponding to the frame of display data; and if the data content of the second transmission data is not void, judges whether a display resolution of the second transmission data is less than a display resolution of the first transmission data, and if the display resolution of the second transmission data is less than the display resolution of the first transmission data, performs image reconstruction of the first display resolution to the second transmission data by difference value processing, and composites the second transmission data after the image reconstruction and the first transmission data into one frame of displayed image to output and display; and if the display resolution of the second transmission data is equal to the display resolution of the first transmission data, composites the first transmission data and the second transmission data into one frame of displayed image to output and display.

The above only describes specific embodiments of the present disclosure. By the teaching of the present disclosure, a person skilled in the art can make other modifications or variations on the basis of the above embodiments. A person skilled in the art should appreciate that, the above specific description is only for the purpose of better explaining the present disclosure, and the protection scope of the present disclosure should be subject to the protection scope of the claims.

What is claimed is:

1. A virtual reality device, comprising a host and a head-mounted display, wherein
the host divides a display area of the head-mounted display into a central area and an edge area according to a field of view of the head-mounted display; segments display data to be transmitted of each frame into first display data corresponding to the central area and second display data corresponding to the edge area, according to ranges of the central area and the edge area; processes the first display data and the second display data respectively according to a preset first transmission factor and a preset second transmission factor, to obtain first transmission data and second transmission data, wherein a bandwidth occupied by the second transmission data is less than a bandwidth occupied by the first transmission data; and sends the first transmission data and the second transmission data to the head-mounted display; and
the head-mounted display receives the first transmission data and the second transmission data sent by the host, performs image reconstruction to the received first transmission data and second transmission data, to obtain a displayed image corresponding to the frame of display data, and outputting and displaying the displayed image;
wherein that the head-mounted display performs image reconstruction to the received first transmission data and second transmission data comprises:

the head-mounted display judges whether data content of the second transmission data is void, and if the data content of the second transmission data is void, reuses image data of the edge area corresponding to a last frame of displayed image, and performs splicing processing to the image data of the edge area and the image data corresponding to the first transmission data, to obtain a displayed image corresponding to the frame of display data; and if the data content of the second transmission data is not void, judges whether a second display resolution of the second transmission data is less than a first display resolution of the first transmission data, and if the second display resolution of the second transmission data is less than the first display resolution of the first transmission data, performs image reconstruction of the first display resolution to the second transmission data by difference value processing, and composites the second transmission data after the image reconstruction and the first transmission data into one frame of displayed image to output and display; and if the second display resolution of the second transmission data is equal to the first display resolution of the first transmission data, composites the first transmission data and the second transmission data into one frame of displayed image to output and display.

2. The virtual reality device according to claim 1, wherein that the host processes the first display data and the second display data respectively according to a preset first transmission factor and a preset second transmission factor, to obtain first transmission data and second transmission data comprises:

the host sets the first display resolution and the second display resolution according to a bandwidth of a data transmission channel, wherein the second display resolution is less than the first display resolution; and presets the first transmission factor as the first display resolution, and presets the second transmission factor as the second display resolution, and sets a display resolution of the first display data corresponding to the central area to be the first display resolution, and sets a display resolution of the second display data corresponding to the edge area to be the second display resolution, to obtain the first transmission data and the second transmission data.

3. The virtual reality device according to claim 1, wherein that the host processes the first display data and the second display data respectively according to a preset first transmission factor and a preset second transmission factor, to obtain first transmission data and second transmission data comprises:

the host sets a first display refresh rate and a second display refresh rate according to a bandwidth of a data transmission channel, wherein the second display refresh rate is less than the first display refresh rate; presets the first transmission factor as the first display refresh rate, and presets the second transmission factor as the second display refresh rate; and sets a display refresh rate of the first display data corresponding to the central area to be the first display refresh rate, and sets a display refresh rate of the second display data corresponding to the edge area to be the second display refresh rate, to obtain the first transmission data and the second transmission data.

4. The virtual reality device according to claim 1, wherein that the host processes the first display data and the second display data respectively according to a preset first transmission factor and a preset second transmission factor, to obtain first transmission data and second transmission data comprises:

the host sets a first display resolution, a first display refresh rate, a second display resolution and a second display refresh rate according to a bandwidth of a data transmission channel, wherein the second display resolution is less than the first display resolution, and the second display refresh rate is less than the first display refresh rate; presets the first transmission factor as the first display resolution and the first display refresh rate, and presets the second transmission factor as the second display resolution and the second display refresh rate; and sets a display resolution and a display refresh rate of the first display data corresponding to the central area respectively to be the first display resolution and the first display refresh rate, and sets a display resolution and a display refresh rate of the second display data corresponding to the edge area respectively to be the second display resolution and the second display refresh rate, to obtain the first transmission data and the second transmission data.

5. The virtual reality device according to claim 1, wherein that the host divides a display area of the head-mounted display into a central area and an edge area according to a field of view of the head-mounted display comprises:

the host acquires a horizontal field of view and a vertical field of view for dividing the display area, sets an area enclosed by the horizontal field of view and the vertical field of view to be the central area, and sets the remaining area of the display area to be the edge area.

* * * * *